(12) United States Patent
Lee

(10) Patent No.: US 12,323,893 B2
(45) Date of Patent: Jun. 3, 2025

(54) METHOD AND APPARATUS FOR RELAYING EMERGENCY RELATED DATA USING BLOCKCHAIN

(71) Applicant: LG ELECTRONICS INC., Seoul (KR)

(72) Inventor: Ki-Dong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 409 days.

(21) Appl. No.: 17/801,425

(22) PCT Filed: Mar. 23, 2021

(86) PCT No.: PCT/KR2021/003541
§ 371 (c)(1),
(2) Date: Aug. 22, 2022

(87) PCT Pub. No.: WO2021/194200
PCT Pub. Date: Sep. 30, 2021

(65) Prior Publication Data
US 2023/0080517 A1 Mar. 16, 2023

Related U.S. Application Data

(60) Provisional application No. 62/993,702, filed on Mar. 24, 2020.

(51) Int. Cl.
*H04W 4/90* (2018.01)
*H04W 4/029* (2018.01)

(52) U.S. Cl.
CPC ............ *H04W 4/90* (2018.02); *H04W 4/029* (2018.02)

(58) Field of Classification Search
None
See application file for complete search history.

(56) References Cited

U.S. PATENT DOCUMENTS

| | | |
|---|---|---|
| 10,182,320 B2 | 1/2019 | Khan |
| 2014/0295785 A1 | 10/2014 | Watson et al. |
| 2017/0072851 A1* | 3/2017 | Shenoy ............ G08G 1/096775 |
| 2018/0222388 A1 | 8/2018 | Shenoy et al. |
| 2019/0037451 A1* | 1/2019 | Chaponniere ......... H04W 76/38 |
| 2019/0364402 A1 | 11/2019 | Lee |
| 2020/0034841 A1 | 1/2020 | Kurian |

OTHER PUBLICATIONS

3GPP TS 26.267 V15.0.0 (Jun. 2018), 3rd Generation Partnership Project, Technical Specification Group Services and System Aspects, eCall Data Transfer, In-band modem solution, General description (Release 15), 36 pages.

* cited by examiner

*Primary Examiner* — Adolf Dsouza
(74) *Attorney, Agent, or Firm* — BRYAN CAVE LEIGHTON PAISNER LLP

(57) ABSTRACT

A first user equipment (UE) receives, from a second UE, a precursory minimum set of data (MSD) via a first block. The first UE starts a timer upon receiving the precursory MSD from the second UE, and waits to receive a report via a second block while the timer is running. The first UE makes a third block based on whether or not the report via the second block has been received, and transmits, to a network, the third block.

15 Claims, 13 Drawing Sheets

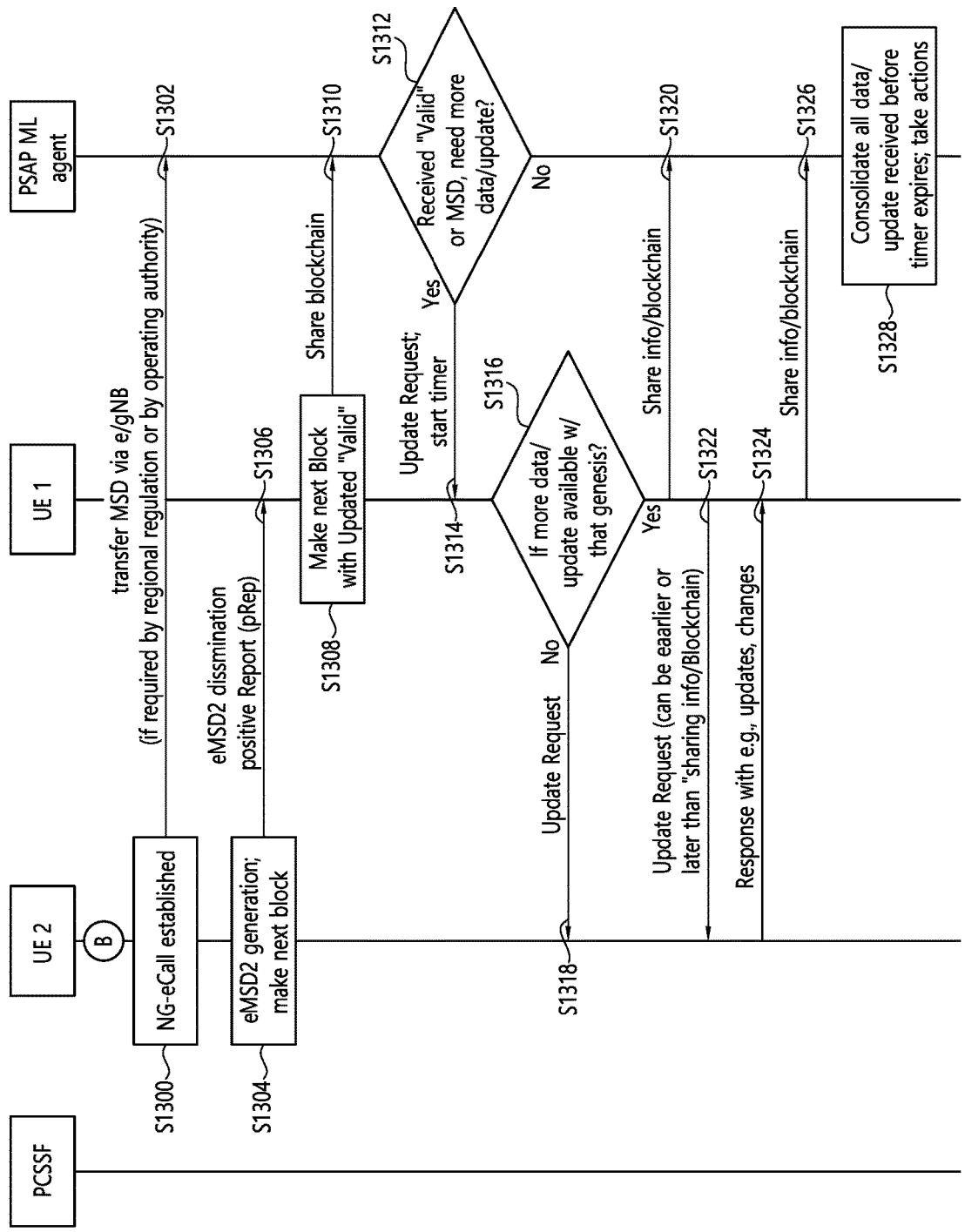

METHOD AND APPARATUS FOR RELAYING EMERGENCY RELATED DATA USING BLOCKCHAIN

CROSS-REFERENCE TO RELATED APPLICATIONS

This application is a National Stage Filing Under 35 U.S.C. 371 of International Application No. PCT/KR2021/003541, filed on Mar. 23, 2021, which claims benefit of U.S. Provisional Application No. 62/993,702, filed on Mar. 24, 2020, the contents of which are all hereby incorporated by reference herein in their entirety.

TECHNICAL FIELD

The present disclosure relates to an efficient method for relaying emergency related data using customized blockchain for emergency call (eCall).

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Emergency call (eCall) refers to an interoperable in-vehicle emergency call service which is envisioned to be introduced and operated across Europe in 2014. According to reports from the European Commission, it is foreseen that eCall will be offered on all new vehicles in the EU by 2014.

A blockchain is a growing list of records, called blocks, which are linked using cryptography. Each block contains a cryptographic hash of the previous block, a timestamp, and transaction data. By design, a blockchain is resistant to modification of its data. This is because once recorded, the data in any given block cannot be altered retroactively without alteration of all subsequent blocks.

For use as a distributed ledger, a blockchain is typically managed by a peer-to-peer network collectively adhering to a protocol for inter-node communication and validating new blocks. Although blockchain records are not unalterable, blockchains may be considered secure by design and exemplify a distributed computing system.

SUMMARY

There may be a need to use blockchain for using (e.g., relaying) emergency related data (e.g., emergency call (eCall)), especially in a case that a user equipment is an out-of-coverage (OOC) area.

In an aspect, a method performed by a first user equipment (UE) operating in a wireless communication system is provided. The method includes receiving, from a second UE, a precursory minimum set of data (MSD) via a first block, starting a timer upon receiving the precursory MSD from the second UE, waiting to receive a report via a second block while the timer is running, making a third block based on whether or not the report via the second block has been received, and transmitting, to a network, the third block.

In another aspect, an apparatus for implementing the above method is provided.

The present disclosure may have various advantageous effects.

For example, it can be achievable to deliver information in the event of an accident in OOC environments.

For example, it can be achievable to ensure integrity of path information of delivering nodes.

For example, a service robot may be utilized later in OOC environments (e.g., search and rescue).

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 13 shows another example of a procedure to which implementations of the present disclosure is applied.

DETAILED DESCRIPTION

Figure 1:
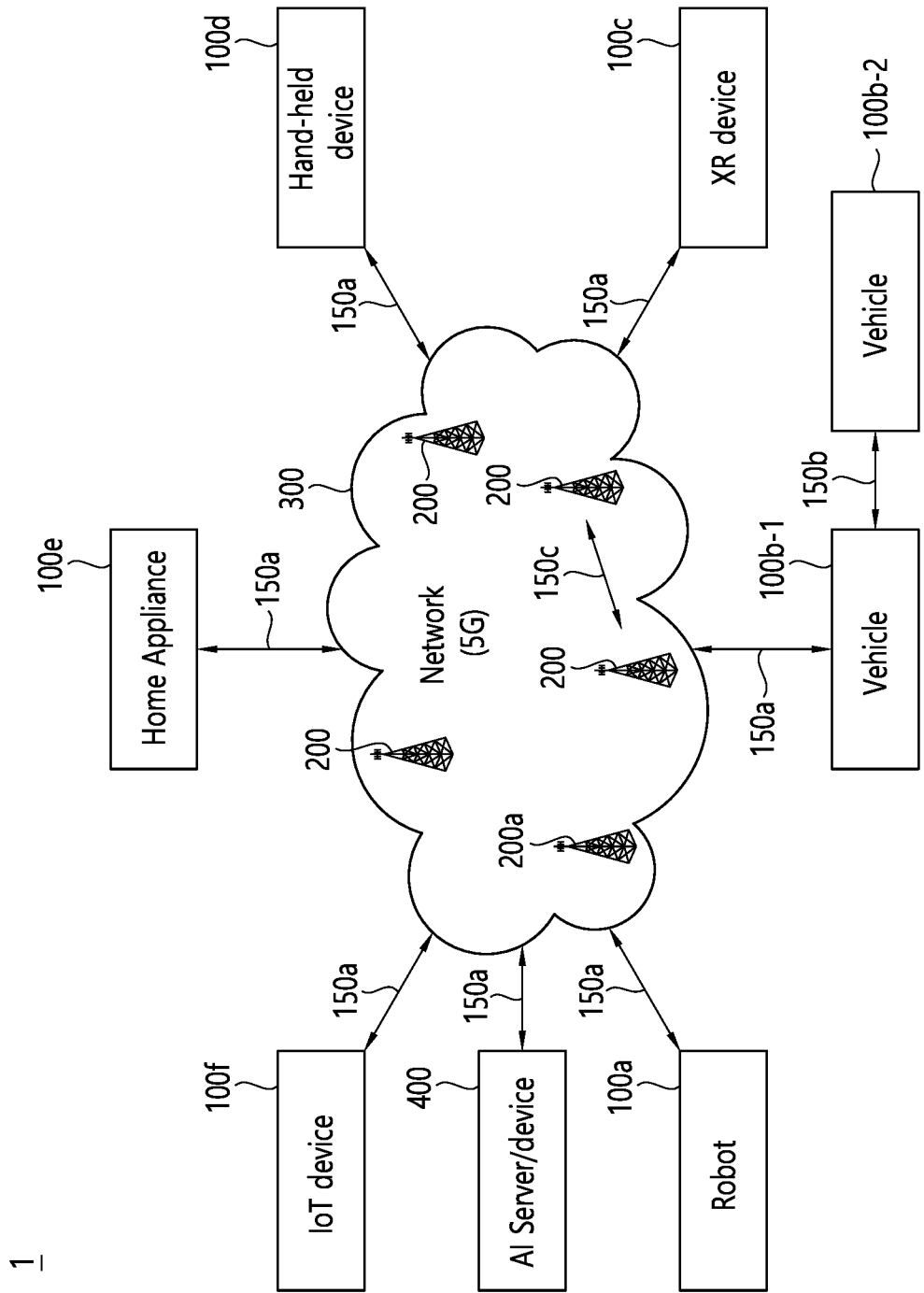
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G new radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e g , channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC).

For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names For example, ZigBee technology may generate personal area networks (PANs) associated with small/low-power digital communication based on various specifications such as IEEE 802.15.4 and may be called various names.

Figure 2:
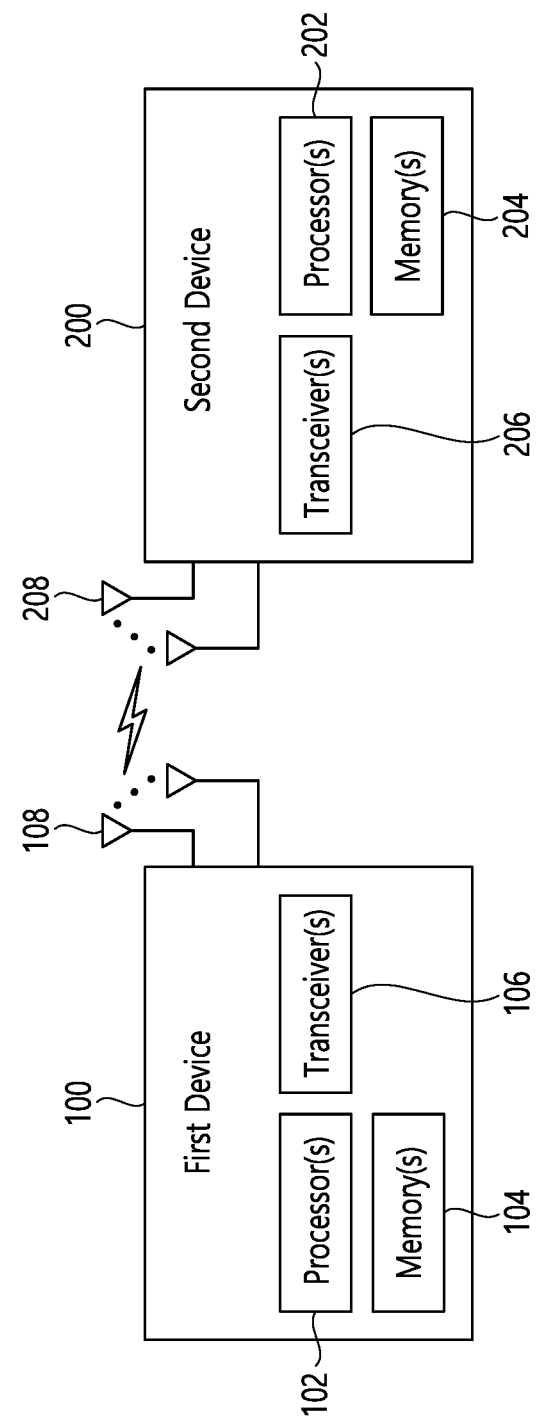
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/ chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands The one or more memories 104 and 204 may be connected to the one or more processors 102 and 202 and store various types of data, signals, messages, information, programs, code, instructions, and/or commands The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
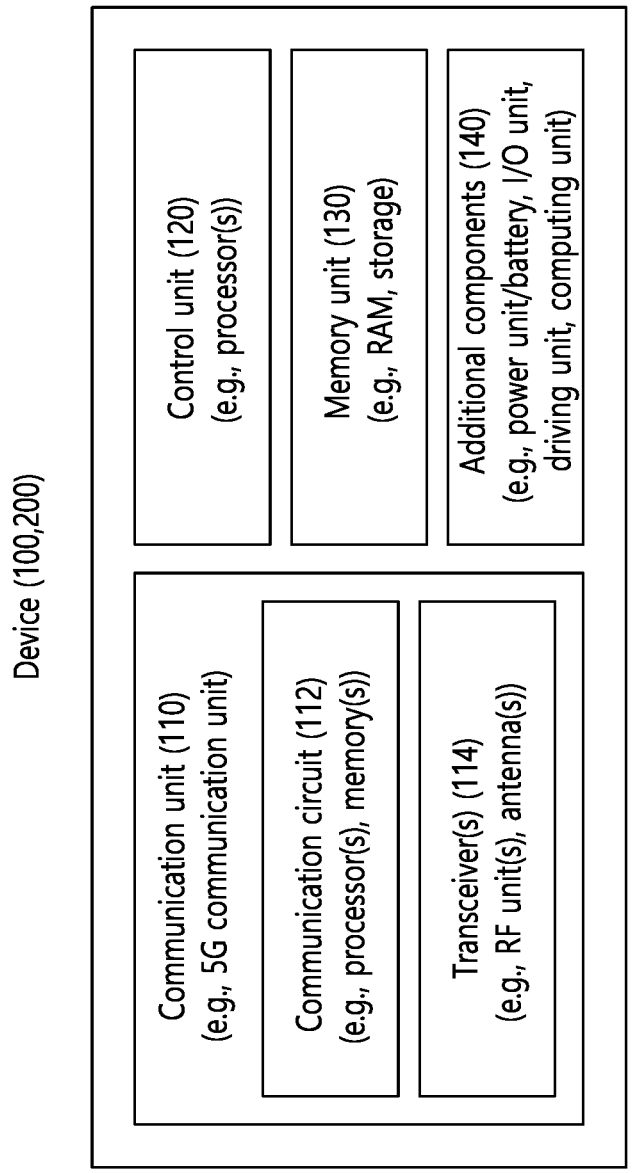
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors.

As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
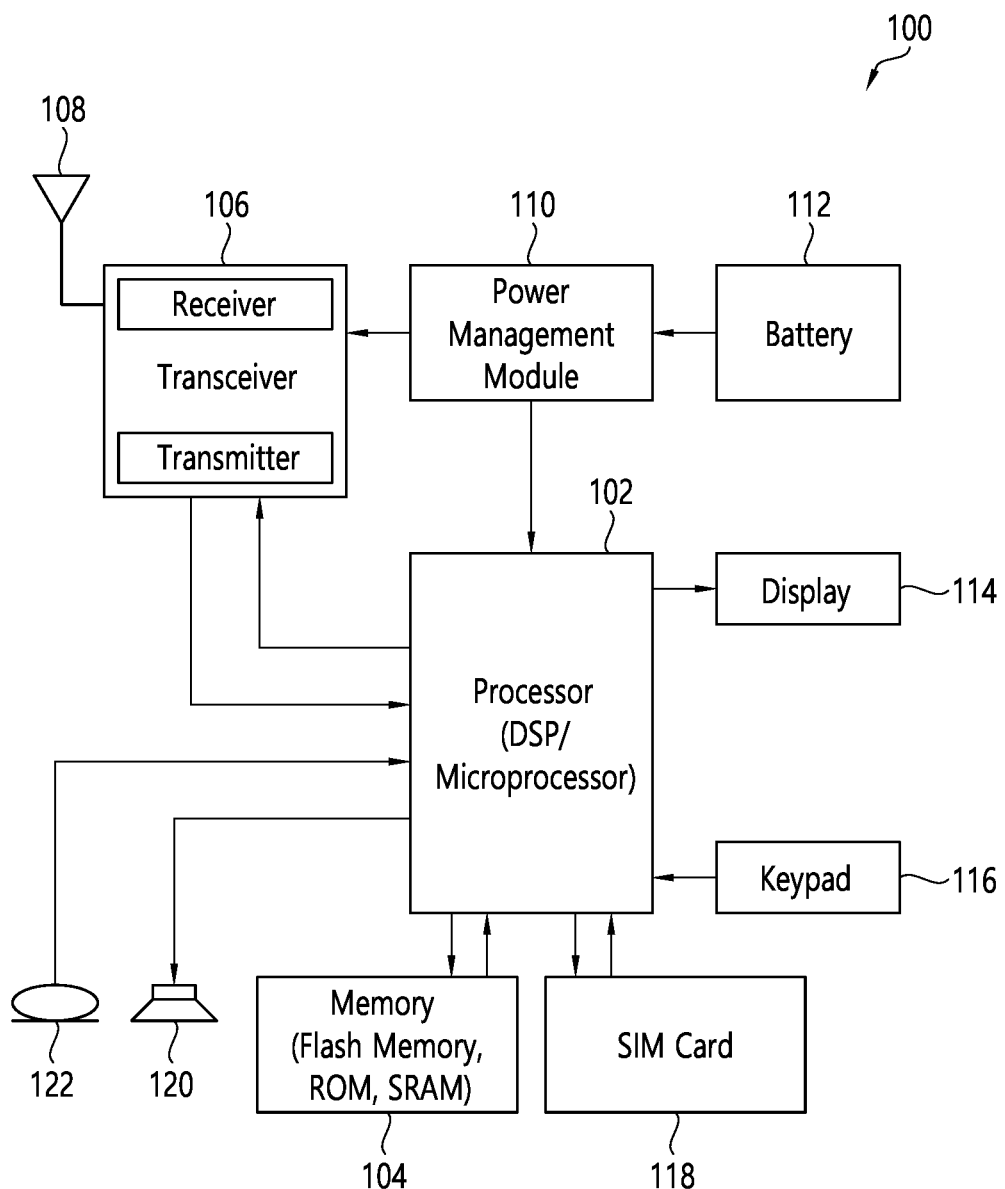
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
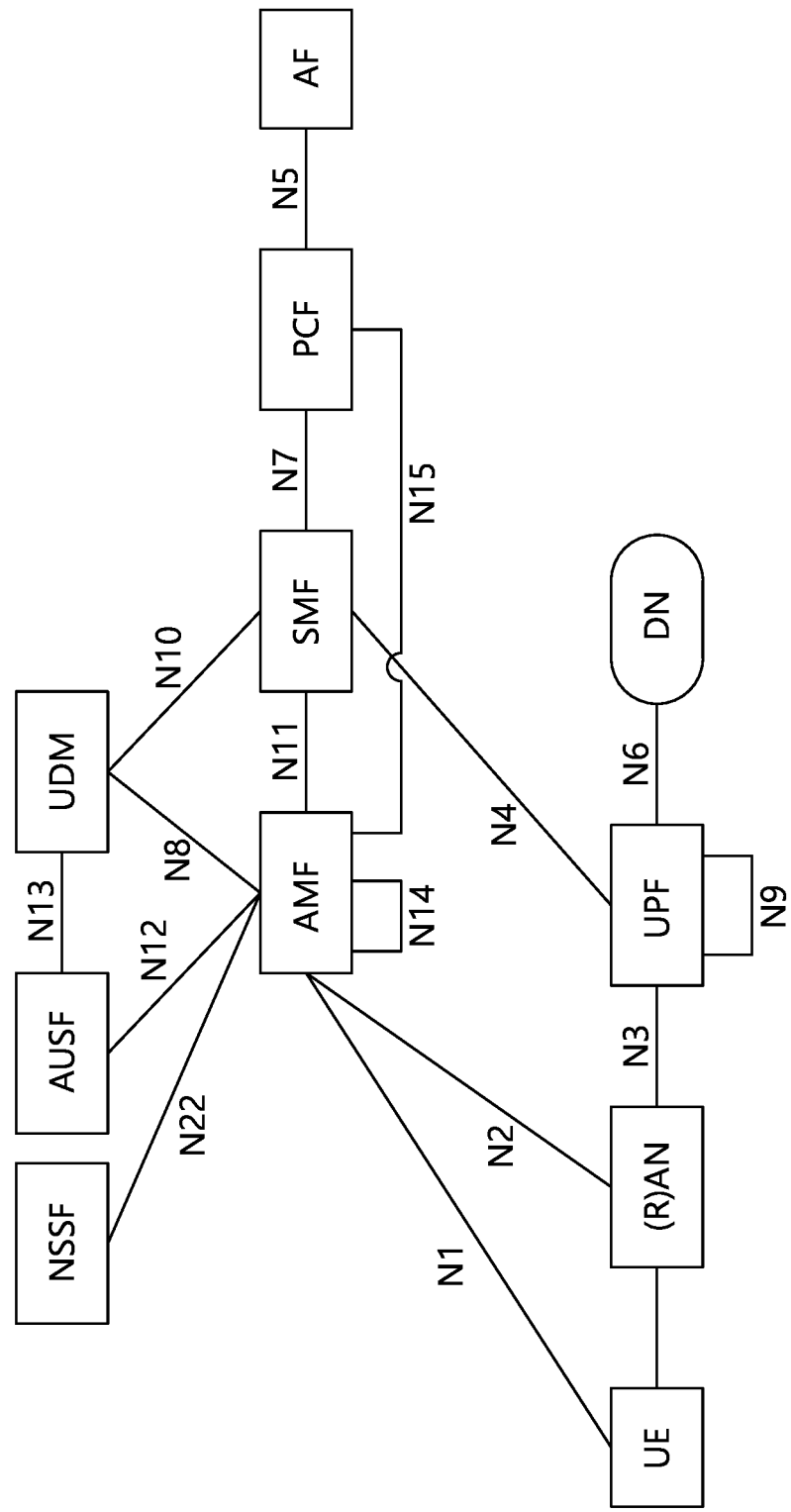
FIG. 5 shows an example of 5G system architecture to which implementations of the present disclosure is applied.

FIG. 5 shows an example of 5G system architecture to which implementations of the present disclosure is applied.

The 5G system (5GS) architecture consists of the following network functions (NF).

Authentication Server Function (AUSF)
Access and Mobility Management Function (AMF)
Data Network (DN), e.g., operator services, Internet access or 3rd party services
Unstructured Data Storage Function (UDSF)
Network Exposure Function (NEF)
Intermediate NEF (I-NEF)
Network Repository Function (NRF)
Network Slice Selection Function (NSSF)
Policy Control Function (PCF)
Session Management Function (SMF)
Unified Data Management (UDM)
Unified Data Repository (UDR)
User Plane Function (UPF)
UE radio Capability Management Function (UCMF)
Application Function (AF)
User Equipment (UE)
(Radio) Access Network ((R)AN)
5G-Equipment Identity Register (5G-EIR)
Network Data Analytics Function (NWDAF)
CHarging Function (CHF)

Emergency call (eCall) is described. Section 4 of 3GPP TS 26.267 V15.0.0 (2018-06) can be referred.

In the description below, the following terms and/or definitions may apply.

AEB: Autonomous emergency braking
AEBS: Advanced emergency braking system, as defined by United Nations Economic Commission for Europe (UN ECE) regulation 131, is considered as a system which can automatically detect a potential forward collision and activate the vehicle braking system to decelerate the vehicle with the purpose of avoiding or mitigating a collision.
CAS: Collision avoidance system, also known as a pre-crash system, forward collision warning system, and/or collision mitigation system, is an automobile safety system designed to prevent or reduce the severity of a collision.
Driving environment: General road vehicle, general road under regional/state/national authority's control or enforcement (e.g., law enforcement)
More civilized driving environment: Driving environment involved with more developed setting, for example, 3D road configuration (e.g., near intersection of freeways with multiple different path ways occupying different altitudes), a certain length of freeway segment containing complex branches involved (e.g., complex ramps, entrance/exist which emergency responder vehicle must obtain very detailed vector/point to go through or reach), automated driving vehicle.

The term "more civilized" against "driving environment" might be different from one generation to another but it is intended to describe more developed environments, as given as examples, such that more detailed design and development of wireless communication technology are expected to properly serve more developed environments for driving.

ACN: Automatic crash/collision notification is an emerging safety technology designed to notify emergency responders that a crash has occurred and provide its location.

AACN: Advanced automatic crash/collision notification, the successor to ACN system, is an emerging safety technology.

Crash and collision are oftentimes used interchangeably.

AIeC: Automatically initiated eCall eCall: A manually or automatically initiated emergency call (TS12) from a vehicle, supplemented with a minimum set of emergency related data (MSD), as defined under the EU Commission's eSafety initiative.

eSafety: European Commission sponsored forum to improve safety aspects of European citizens.

This can be applied to citizens of any country where this technology is available.

MIeC: Manually Initiated eCall

MSD: The minimum set of data forming the data component of an eCall sent from a vehicle to a public safety answering point (PSAP) or other designated emergency call center. The MSD has a maximum size of 140 bytes and includes, for example, vehicle identity, location information and time-stamp.

eMSD: The enhanced MSD can include vertical location coordinates (relative or absolute). The eMSD may be represented in the form of blockchain (i.e., who made what information, when the information is made, where the information is made, and based on what kind of previous information (previous block)).

MSD data frame: Uplink signal transmission interval containing the data of one MSD (after synchronization has been established)—corresponds to a time interval of 1320 ms or 10560 samples (fast modulator) and 2320 ms or 18560 samples (robust modulator) assuming an 8 kHz sampling rate.

PCSSF: Pre-crash system (PCS) sensing function

Figure 6:
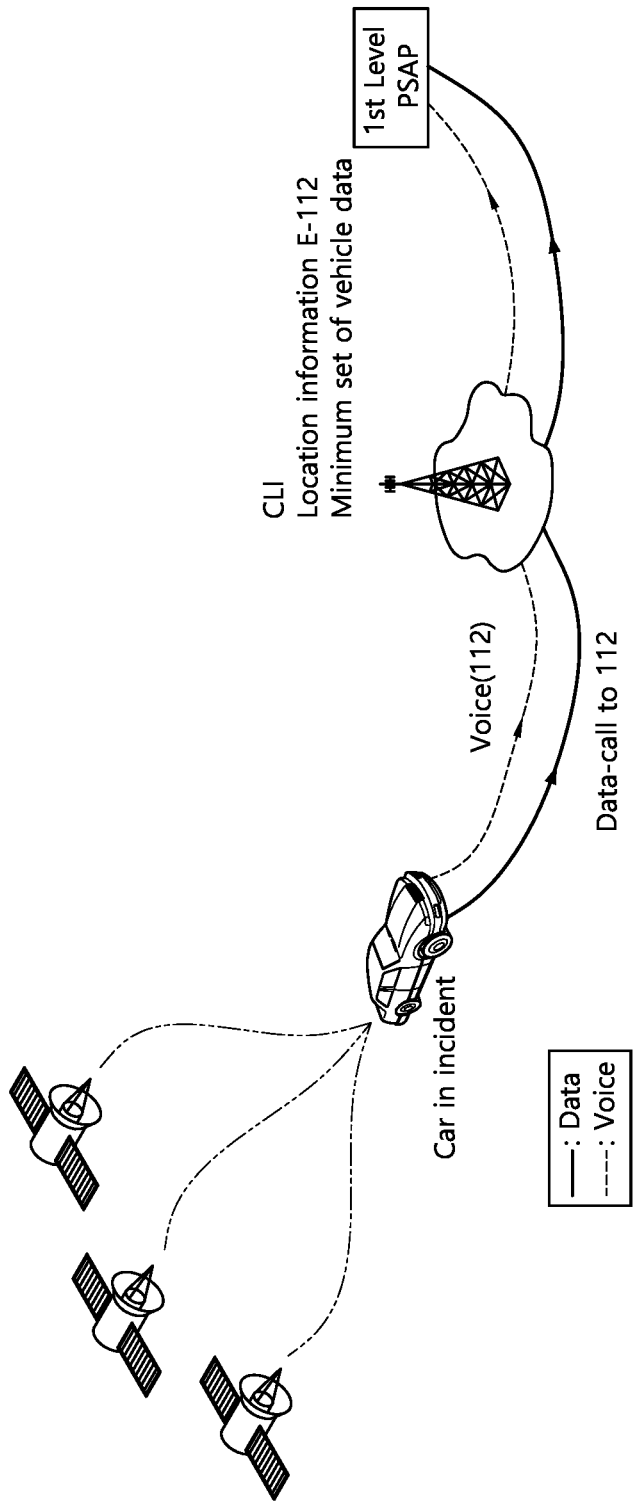
FIG. 6 shows an example of eCall system overview to which implementations of the present disclosure is applied.

FIG. 6 shows an example of eCall system overview to which implementations of the present disclosure is applied.

Referring to FIG. 6, in the event of a vehicle collision, the eCall in-band modem solution is used in an automatically or manually established emergency voice call (E112) from the vehicle (IVS) via the cellular network to the local emergency agencies, i.e., the PSAP. The eCall modem allows to transfer a data message from the IVS over the cellular network to the PSAP which is denoted as eCall MSD. The MSD can include, e.g., vehicle location information, time stamp, number of passengers, vehicle identification number (VIN), and other relevant accident information.

It is expected that the eCall MSD information will be sent either immediately following the establishment of the voice call or at any point later during the voice call. The integrity of the eCall data sent from the vehicle to the PSAP is ensured by the specified modem.

The eCall is a European regional requirement. It shall not have an impact on the global circulation of terminals.

The eCall service requirements have been defined as follows.

The data may be sent prior to, in parallel with, or at the start of the voice component of an emergency call.

Should the PSAP request additional data then this may be possible during the established emergency call.

The realization of the transfer of data during an emergency call shall minimise changes to the originating and transit networks.

Both the voice and data components of the emergency call shall be routed to the same PSAP or designated emergency call center.

The transmission of the data shall be acknowledged and if necessary data shall be retransmitted.

A UE configured only to transfer data during emergency calls (e.g., eCall only UE) shall not generate signalling to the network besides what is needed to place an emergency call.

The UE shall indicate at call setup if the emergency call will carry supplementary data.

The following specific requirements are considered necessary for the satisfactory operation of the eCall service. Additionally, all existing TS12 emergency call requirements shall apply.

An eCall shall consist of a TS12 emergency call supplemented by a minimum set of emergency related data (MSD).

An eCall may be initiated automatically, for example due to a vehicle collision, or manually by the vehicle occupants.

An IVS, or other UE designed to support eCall functionality, shall include in the emergency call set-up an indication that the present call is either a MIeC or an AIeC.

The MSD sent by the IVS to the network shall not exceed 140 bytes.

The MSD should typically be made available to the PSAP within 4 seconds, measured from the time when end to end connection with the PSAP is established.

Should the MSD component not be included in an eCall, or is corrupted or lost for any reason, then this shall not affect the associated TS12 emergency call speech functionality.

A call progress indication shall be provided to the user whilst the MSD transmission is in progress.

To reduce the time taken to establish an eCall an IVS whilst in eCall only mode, may receive network availability information whilst not registered on a public land mobile network (PLMN).

Optionally, PLMNs may make use of eCall indicators, received in the emergency call set-up, to differentiate eCalls from other TS12 emergency calls.

The MIeC and AIeC may be used to filter or route eCalls to a dedicated PSAP operators.

Throughout the duration of the emergency call and following receipt of the MSD by the PSAP It shall be possible for the PSAP to send a confirmation to the IVS that the MSD has been acted upon.

It shall be possible for the PSAP to request the IVS to re-send its most recent MSD.

It shall be possible for the PSAP to instruct the IVS to terminate the eCall.

Figure 7:
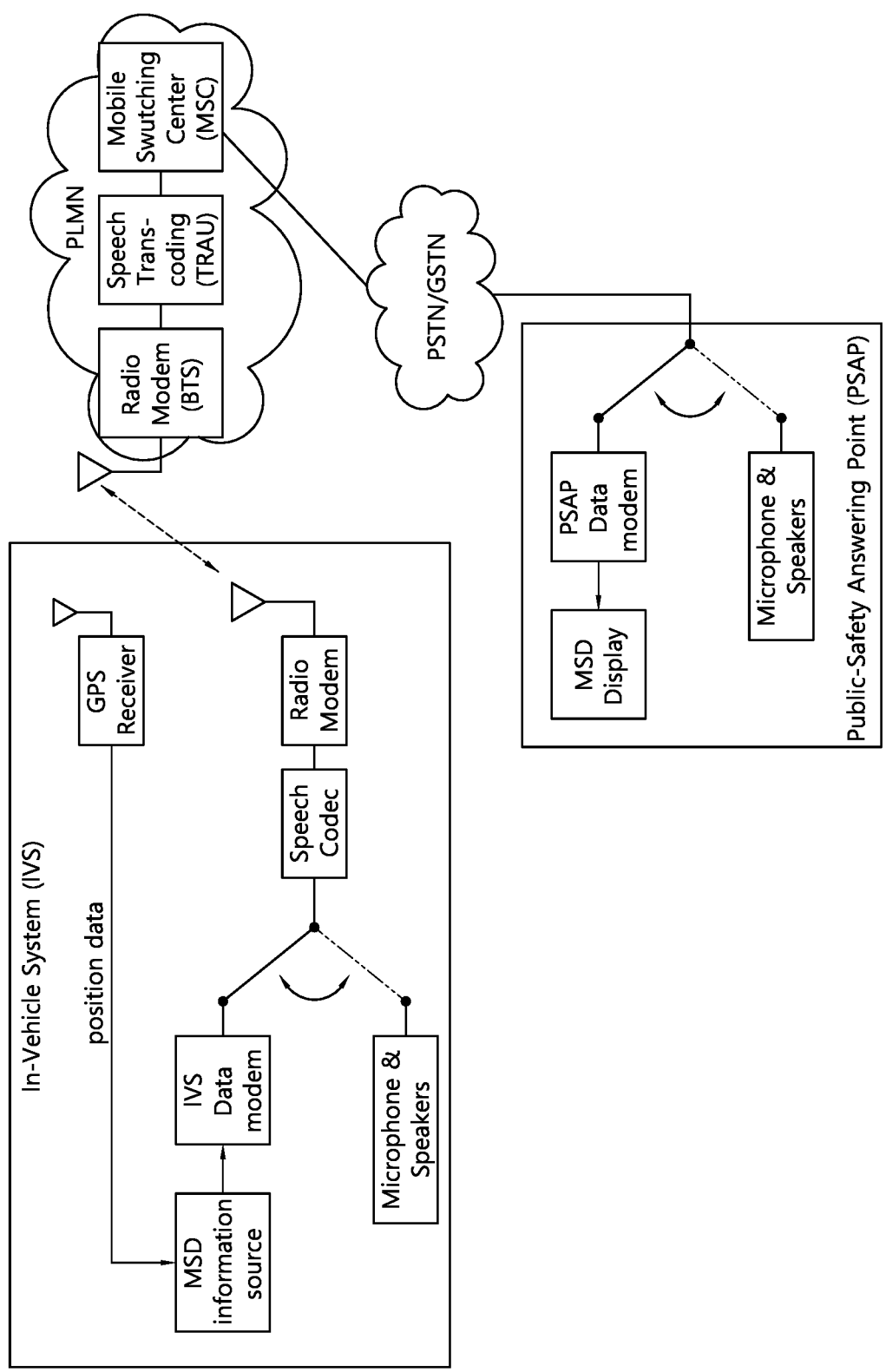
FIG. 7 shows an example of eCall system within the cellular system architecture, including the IVS and PSAP data modems, to which implementations of the present disclosure is applied.

FIG. 7 shows an example of eCall system within the cellular system architecture, including the IVS and PSAP data modems, to which implementations of the present disclosure is applied.

Referring to FIG. 7, after an emergency voice call has been (automatically or manually) established, the IVS modem receiver constantly monitors the incoming signal from the speech decoder output. When prompted by a request from the PSAP operator for MSD, the IVS connects the IVS data modem transmitter to the input of the speech coder and mutes any speech from the motorist for the duration of MSD transmission to prevent it from interfering with the eCall data transmission. Alternatively, it can be the IVS that may trigger the MSD transmission. In this case, the IVS asks the PSAP to request an MSD transmission.

The first operation mode shall be referred to as the pull mode whereas the latter one is the push mode. Essentially, push mode is realized by a request from the IVS to the PSAP to pull the MSD.

The MSD has been standardized by the European Committee for Standardization. In case of incident, the PSAP receives the MSD including the following information (this list is not exhaustive):

Message identifier: MSD format version (later versions to be backwards compatible with existing versions).
Activation: whether the eCall has been manually or automatically generated
Call type: whether the eCall is real emergency or test call
Vehicle type: passenger Vehicle, buses and coaches, light commercial vehicles, heavy duty vehicles, motorcycles
Vehicle identification number (VIN)
Vehicle propulsion storage type: This is important particularly relating to fire risk and electrical power source issues (e.g. Gasoline tank, Diesel tank, Compressed natural gas (CNG), etc.)
Time stamp: Timestamp of incident event
Vehicle location: determined by the on-board system at the time of message generation. It is the last known vehicle's position (latitude and longitude)
Confidence in position: this bit is to be set to "Low confidence in position" if the position is not within the limits of +/−150 m with 95% confidence
Direction: helpful to determine the carriageway vehicle was using at the moment of the incident
Recent vehicle location n (Optional): vehicle's position in (n-1) and (n-2)
Number of passengers (Optional): number of fastened seatbelts
Optional additional data (Optional): in some cases, optional data may be available in the MSD (at the vehicle manufacturer discretion). This data incorporate a tag for the identification in the beginning of the optional data (type and structure identification). This data will be registered and maintained. PSAP will have free access such data registry data.

Figure 8:
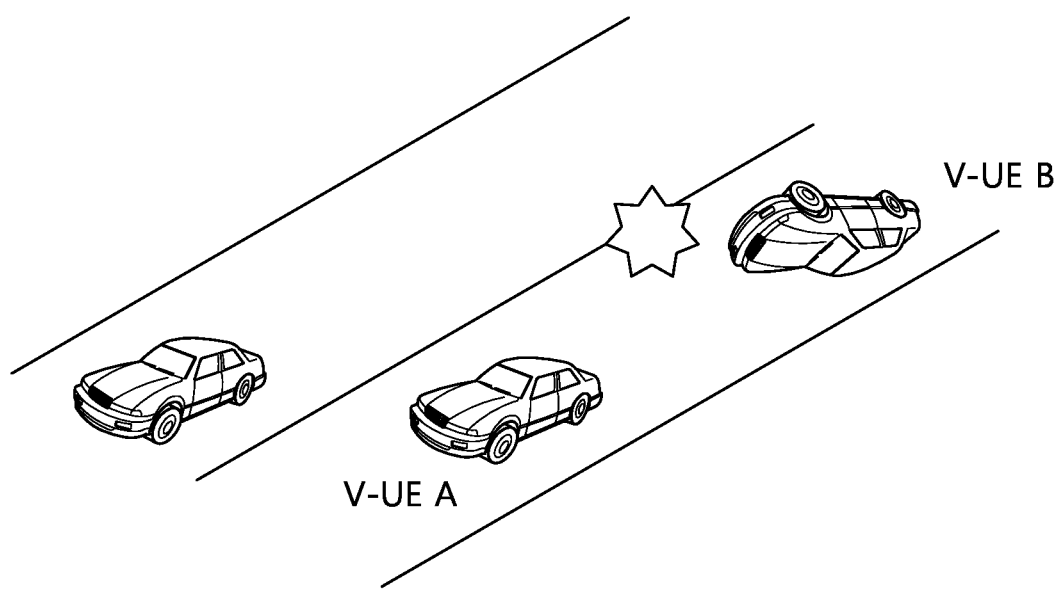
FIG. 8 shows an example of triggering eCall to which implementations of the present disclosure is applied.

FIG. 8 shows an example of triggering eCall to which implementations of the present disclosure is applied.

Referring to FIG. 8, vehicle UE (V-UE) B got an accident that triggered an eCall. A V-UE can get into an accident by itself or with other vehicle(s).

Figure 9:
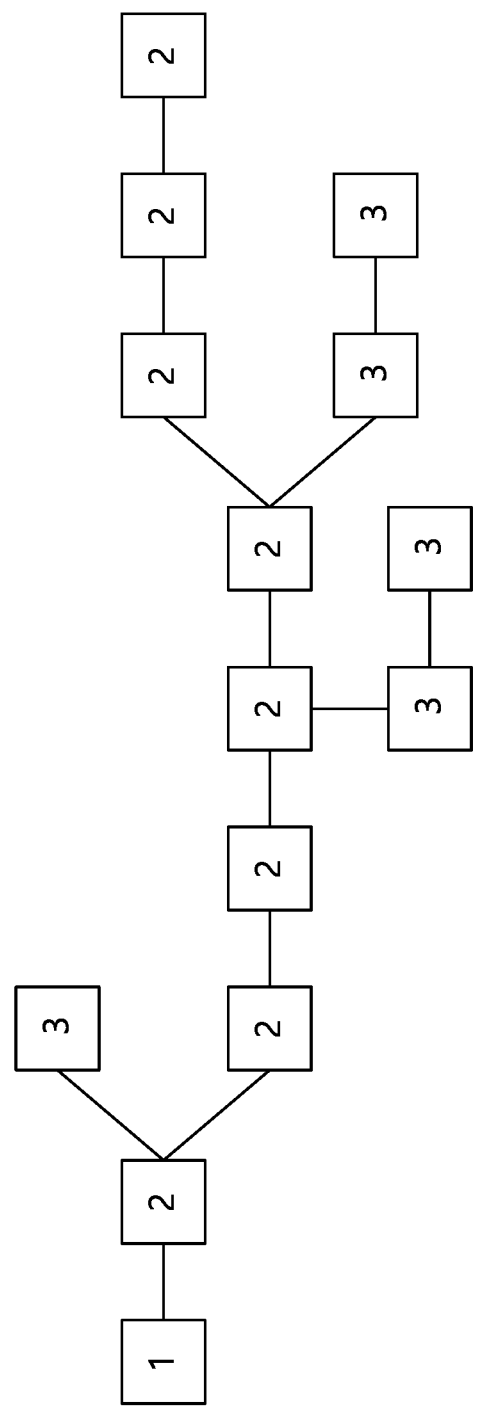
FIG. 9 shows an example of a blockchain formation to which implementations of the present disclosure is applied.

FIG. 9 shows an example of a blockchain formation to which implementations of the present disclosure is applied.

Referring to FIG. 9, the block marked as "1" is an initial block or a genesis block.

The blocks marked as "2" belong to a main chain consisting of the longest series of blocks from the genesis block to the current block. The blocks marked as "3" are orphan blocks existing outside of the main chain, which are still valid blocks and can be attached to the main chain later.

Blocks hold batches of valid transactions that are hashed and encoded into a Merkle tree. Each block includes the cryptographic hash of the prior block in the blockchain, linking the two. The linked blocks form a chain. This iterative process confirms the validity of the order of a new block that is next to a block already included in the blockchain, which this new block is claiming to be its previous block, all the way back to the initial block, which is known as the genesis block.

Sometimes, separate blocks can be produced concurrently, creating a temporary fork. In addition to a secure hash-based history, any blockchain has a specified algorithm for scoring different versions of the history so that one with a higher score can be selected over others. Blocks not selected for inclusion in the chain are called orphan blocks. Peers supporting the database have different versions of the history from time to time. They keep only the highest-scoring version of the database known to them. Whenever a peer receives a higher-scoring version (usually the old version with a single new block added), they extend or overwrite their own database and retransmit the improvement to their peers.

As mentioned above, the eCall has been specified using a circuit-switched (CS) based method in which MSD is transferred to PSAP in parallel to the voice using the voice channel. Recently, supporting eCall using IP multimedia subsystem (IMS) has been discussed. This particular type of eCall (i.e., "eCall Over IMS") may be called next-generation eCall (NG-eCall). The term "NG" is for distinguishing eCall Over IMS from the conventional CS based eCall and is not related to any 5G related specification. The NG-eCall is a fully packet-switched (PS) version of eCall in which in-band modem is not used any more. That is, voice/MSD may be sent together over IMS just using the existing format.

There have been a series of progresses made successful for supporting basic V2X safety service/scenarios and advanced V2X services and there have been automotive industry/association efforts both in their effort for commercialization in the near future and in the effort in making further advanced use cases. However, the effort made so far is largely focused on helping prevent accidents (or such), but there doesn't seem to exist much effort in making post-accident use case scenarios.

For example, how first responders can get dispatchable information (e.g., more accurate location information) for the reported scene of accident more effectively, especially in a more civilized driving environment (e.g., multi-level 3D layout of roads, self-driving features), may need to be considered. The first responders should know in which road, among vertically-layered roads, the accident has happened, in order to reach the scene timely and correctly. For this, enhanced MSD (eMSD) which carries more accurate location information by including, e.g., altitude information (vertical coordinate, relative or absolute), may be helpful for the first responders to reach the scene timely and correctly.

Furthermore, when the eCall is established by a vehicle accident, in-coverage scenario (not just in home PLMN (HPLMN) and/or visited PLMN (VPLMN)) may be assumed. In other words, the conventional eCall procedure may be designed on the premise of in-coverage scenario in which the eCall can be made without problem in perspective of network. However, in out-of-coverage (OOC) scenario, it may be impossible to inform the status of the accident. The eCall may be possible in limited service state, but impossible if there is no network (i.e., OOC).

Furthermore, if the UE is completely damaged so that a relevant emergency call (NG-eCall and/or eCall) cannot be made, there is no other solution that the UE can automatically or manually (by driver and/or passenger) call to the network (e.g., PSAP).

According to implementations of the present disclosure, UEs in proximity (e.g., neighboring UEs/robots/vehicles), if any, may be utilized for delivering/relaying emergency related data. The relaying architecture according to implementations of the present disclosure may be used especially in a case of OOC. For example, the UE of accident may send the emergency related data to the network (e.g., PSAP and/or related server such as multi-access edge computing (MEC)

server) with help of neighboring UEs/robots/vehicles, if any. The neighboring UEs/robots/vehicles may forward the received emergency related data to the network in real time. Or, the neighboring UEs may store the received emergency related data and forward to the network in later.

According to implementations of the present disclosure, the emergency related data may be shared with neighboring UEs/robot/vehicles, if any, by an integrity protected method, so that the neighboring UEs/robots/vehicles can deliver the emergency related data to the network (e.g., PSAP and/or related server such as MEC server). Since it is a form of secondary communication of the emergency related data by neighboring UEs/robots/vehicles rather than network node, it may be necessary to provide the emergency related data via integrity-protected path. For this, blockchain technology may be applied to provide the emergency related data via integrity-protected path.

According to implementations of the present disclosure, a blockchain may be a private chain that the UE of accident and/or UE of potential accident may generate a block starting from the genesis block. The neighboring UEs/robots/vehicles, if any, may also make next block for the blockchain. The next block may contain information on time when the neighboring UEs/robots/vehicles have received the generated blockchain and/or information on location/direction/latest speed of the neighboring UEs/robots/vehicles.

According to implementations of the present disclosure, eMSD may be enhanced version of MSD. The eMSD may include a customized version of blockchain which contains the UE's emergency related data, which may be associated with the pre-crash sensing data and/or with the basic information related to the UE (e.g., VIN, location information, time stamp, etc.). For example, the UE's emergency related data contained in the eMSD may include altitude information, e.g., vertical coordinate of the accident point and/or the UE. The vertical coordinate may be relative to a reference point and/or may have an absolute value.

According to implementations of the present disclosure, a timer may be set when eMSD is sent in advance as precursory information.

According to implementations of the present disclosure, the NG-eCall (and/or CS based eCall) may still be made from the UE of accident if available or if required by regulatory requirements. The eMSD may be disseminated based on the established eCall which may be initiated based on indication from PCSSF.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 10:
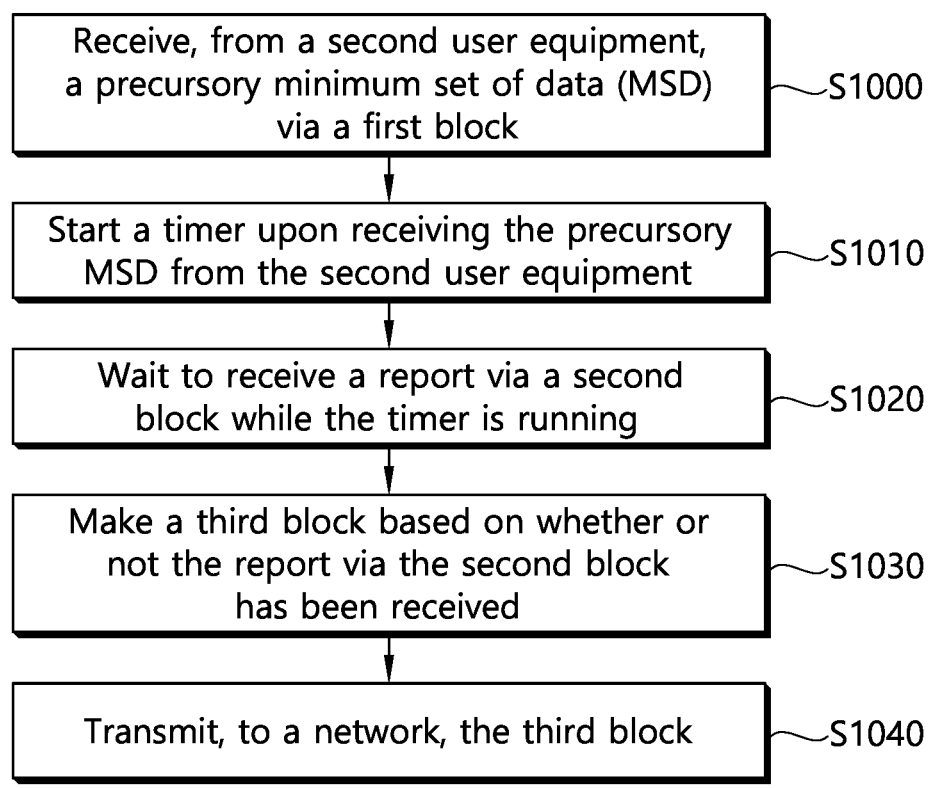
FIG. 10 shows an example of a method performed by a first UE to which implementations of the present disclosure is applied.

FIG. 10 shows an example of a method performed by a first UE to which implementations of the present disclosure is applied.

In step S1000, the first UE receives, from a second UE, a precursory MSD (e.g., eMSD) via a first block.

In some implementations, the second UE may sense that an accident can happen based on an indication from a PCSSF of the second UE. The first block may be a genesis block of a blockchain. The first block may include information on a coordinate of an accident including a vertical coordinate of the accident.

In step S1010, the first UE starts a timer upon receiving the precursory MSD.

In step S1020, the first UE waits to receive a report via a second block while the timer is running.

In step S1030, the first UE makes a third block based on whether or not receive the report via the second block has been received.

In some implementations, the third block may inform that accident-related precursory information was not updated based on the report being not received via the second block until the timer expires. That is, when the report is not received via the second block until the timer expires, the third block may inform that accident-related precursory information was not updated.

In some implementations, the third block may inform that an accident did not happen based on the report which is a negative report being received via the second block. That is, when the negative report is received via the second block, the third block may inform that an accident did not happen In some implementations, the third block may inform that an accident happened based on the report which is a positive report being received via the second block. That is, when the positive report is received via the second block, the third block may inform that an accident happened.

In some implementations, the third block may include information on a location, a direction and/or a speed of the second UE which is a UE with an accident or probable to have an accident. The second block may include information on a coordinate of an accident including a vertical coordinate of the accident.

In step S1040, the first UE transmits, to a network, the third block.

In some implementations, the third block may be preferentially transmitted to the network than the first block and/or the second block.

In some implementations, the network may correspond to PSAP and/or MEC server.

In some implementations, the first UE may be in communication with at least one of a mobile device, a network, and/or autonomous vehicles other than the first UE. Or, the first/second UE may be a service robot.

Furthermore, the method in perspective of the first UE described above in FIG. 10 may be performed by the first wireless device 100 shown in FIG. 2, the wireless device 100 shown in FIG. 3, and/or the UE 100 shown in FIG. 4.

More specifically, the first UE comprises at least one transceiver, at least one processor, and at least one computer memory operably connectable to the at least one processor and storing instructions that, based on being executed by the at least one processor, perform operations below.

The operations comprise receiving, from a second UE, a precursory MSD (e.g., eMSD) via a first block.

In some implementations, the second UE may sense that an accident can happen based on an indication from a PCSSF of the second UE. The first block may be a genesis block of a blockchain. The first block may include information on a coordinate of an accident including a vertical coordinate of the accident.

The operations comprise starting a timer upon receiving the precursory MSD.

The operations comprise waiting to receive a report via a second block while the timer is running.

The operations comprise making a third block based on whether or not the report via the second block has been received.

In some implementations, the third block may inform that accident-related precursory information was not updated based on the report being not received via the second block until the timer expires. That is, when the report is not received via the second block until the timer expires, the third block may inform that accident-related precursory information was not updated.

In some implementations, the third block may inform that an accident did not happen based on the report which is a negative report being received via the second block. That is, when the negative report is received via the second block, the third block may inform that an accident did not happen In some implementations, the third block may inform that an accident happened based on the report which is a positive report being received via the second block. That is, when the positive report is received via the second block, the third block may inform that an accident happened.

In some implementations, the third block may include information on a location, a direction and/or a speed of the second UE which is a UE with an accident or probable to have an accident. The second block may include information on a coordinate of an accident including a vertical coordinate of the accident.

The operations comprise transmitting, to a network, the third block.

In some implementations, the third block may be preferentially transmitted to the network than the first block and/or the second block.

In some implementations, the network may correspond to PSAP and/or MEC server.

Furthermore, the method in perspective of the first UE described above in FIG. 10 may be performed by control of the processor 102 included in the first wireless device 100 shown in FIG. 2, by control of the communication unit 110 and/or the control unit 120 included in the wireless device 100 shown in FIG. 3, and/or by control of the processor 102 included in the UE 100 shown in FIG. 4.

More specifically, an apparatus operating in a wireless communication system (e.g., first UE) comprises at least one processor, and at least one computer memory operably connectable to the at least one processor. The at least one processor is configured to perform operations comprising: obtaining a precursory MSD via a first block, starting a timer upon obtaining the precursory MSD, waiting to receive a report via a second block while the timer is running, and making a third block based on whether or not the report via the second block has been received.

Furthermore, the method in perspective of the first UE described above in FIG. 10 may be performed by a software code 105 stored in the memory 104 included in the first wireless device 100 shown in FIG. 2.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM), ROM, non-volatile random access memory (NVRAM), EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically, at least one CRM stores instructions that, based on being executed by at least one processor, perform operations comprising: obtaining a precursory MSD via a first block, starting a timer upon obtaining the precursory MSD, waiting to receive a report via a second block while the timer is running, and making a third block based on whether or not the report via the second block has been received.

Figure 11:
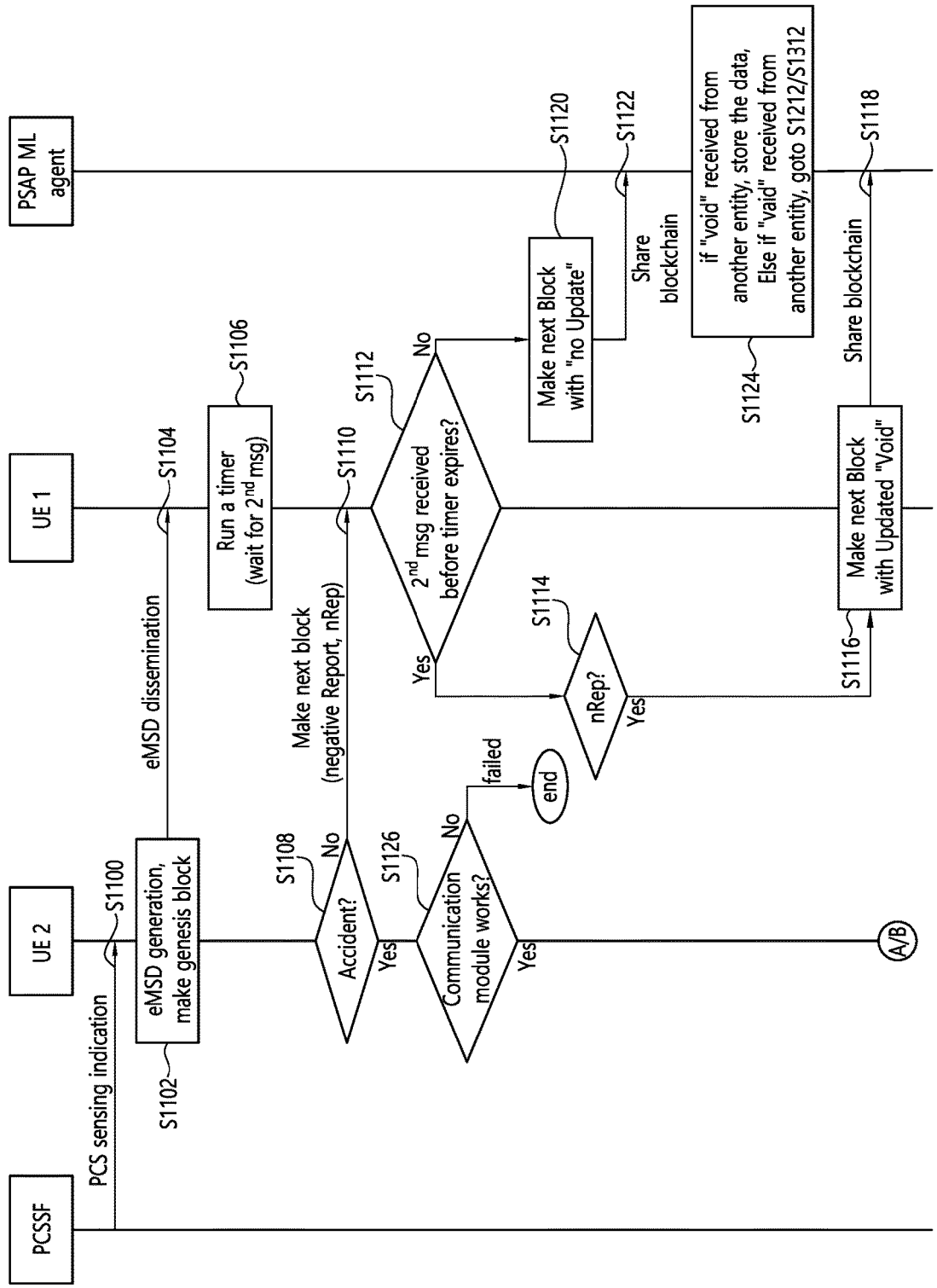
FIG. 11 shows an example of a procedure to which implementations of the present disclosure is applied.

FIG. 11 shows an example of a procedure to which implementations of the present disclosure is applied.

In step S1100, the UE 2 may get input from PCSSF, e.g., PCS sensing indication. This step may happen in advanced, e.g., around T seconds (or milliseconds) before the crash.

In step S1102, the UE 2 may generate eMSD. For this, the UE 2 may make a genesis block (e.g., first block) as the eMSD.

In step S1104, the UE 2 may transmit/disseminate the eMSD to the UE 1.

In step S1106, upon receiving the eMSD, the UE 1 may start a timer for which the second message (e.g., next block and/or second block) is waited.

In step S1108, the UE 2 may check whether the accident actually happens.

If the accident does not happen in step S1108, in step S1110, the UE 2 may make a next block (e.g., second block) for a negative report and transmit/disseminate the next block to the UE 1. The negative report may inform that the accident does not happen.

In step S1112, the UE 1 may check whether the second message (e.g., next block and/or second block) is received from the UE 2 before the timer expires.

If the second message (e.g., next block and/or second block) is received from the UE 2 before the timer expires, in step s1114, the UE 1 may check whether the second message is for negative report. If yes, in step S1116, the UE 1 may make a next block (e.g., third block) with status updated as "void". In step S1118, the UE 1 may share blockchain including the third block with the network (e.g., PSAP).

If the second message (e.g., next block and/or second block) is not received from the UE 2 before the timer expires, in step S1120, the UE 1 may make a next block (e.g., third block) with "no update". In step S1122, the UE 1 may share blockchain including the third block with the network (e.g., PSAP).

In step S1124, if the block with status updated as "void" is received, the network (e.g., PSAP) may store the block. Else if the block with status updated as "valid" is received, the network (e.g., PSAP) may perform actions according to step S1212, which will be described below in FIG. 12, or according to step S1312, which will be described below in FIG. 13.

Alternatively, if the accident actually happens in step S1108, the UE 2 may check the communication module works or not. If the communication module does not work, the procedure may end. If the communication module still works, procedures to be described in FIG. 12 or FIG. 13 may be performed.

Figure 12:
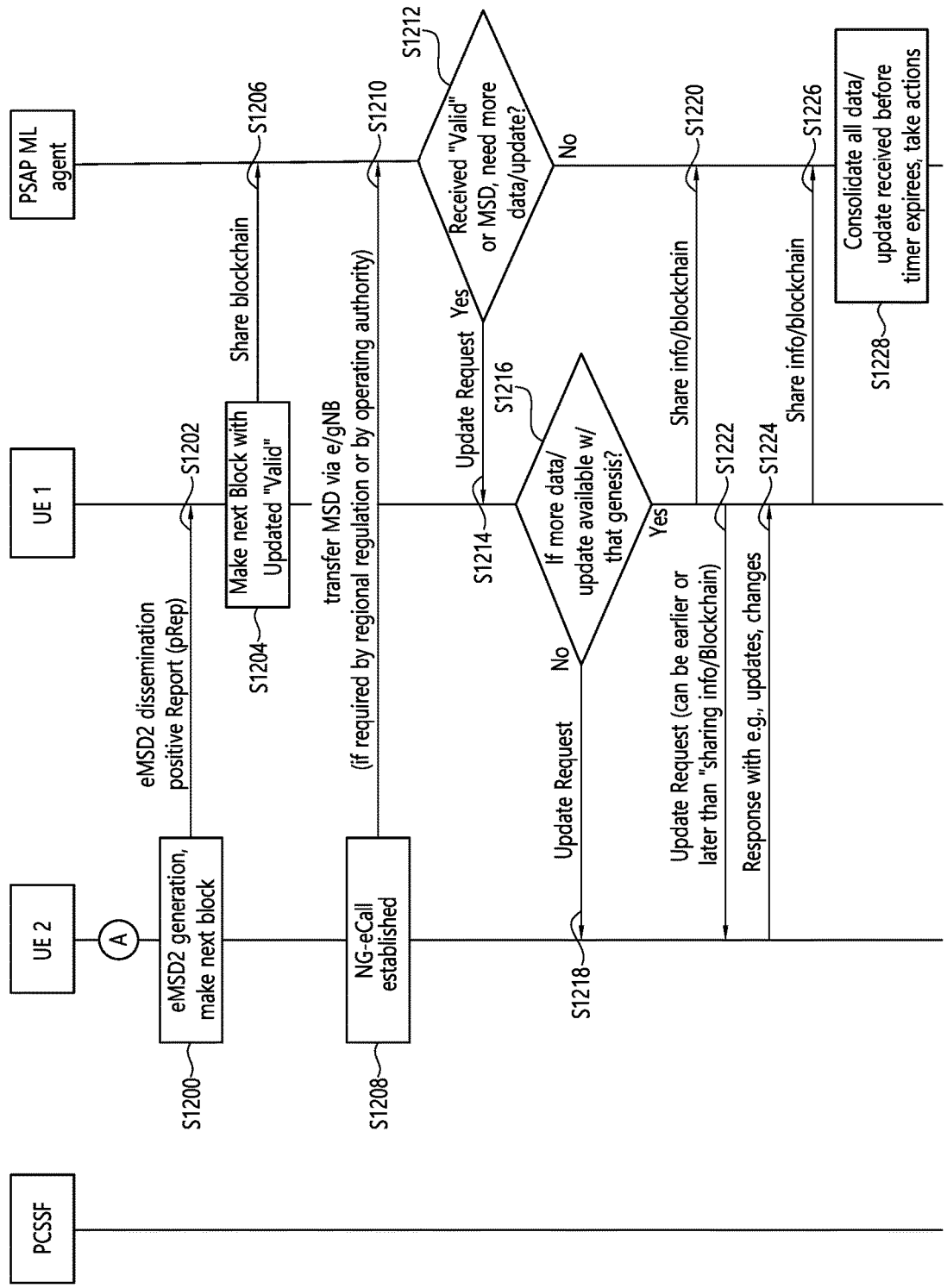
FIG. 12 shows another example of a procedure to which implementations of the present disclosure is applied.

FIG. 12 shows another example of a procedure to which implementations of the present disclosure is applied.

Procedures shown in FIG. 12 may be performed following the procedures shown in FIG. 11.

If it is checked that the accident actually happens in step S1108 in FIG. 11, and if it is checked that the communication module still works in step S1126 in FIG. 11, in step S1200, the UE 2 may generate the second eMSD. For this, the UE 2 may make a next block (e.g., second block) as the second eMSD for a positive report. The positive report may inform that the accident actually happens.

In step S1202, the UE 2 may transmit/disseminate the second eMSD (e.g., second block) to the UE 1.

In step S1204, upon receiving the second eMSD (e.g., second block) from the UE 2, the UE 1 may make a next block (e.g., third block) with status updated as "valid".

In step S1206, the UE 1 may share blockchain including the third block with the network (e.g., PSAP).

In step S1208, the UE 2 may establish NG-eCall.

In step S1210, the UE 2 may transfer MSD to the network (e.g., PSAP) via eNB/gNB based on the established NG-eCall, if required by regional regulation or by operating authority.

In step S1212, the network (e.g., PSAP) may check whether eMSD with status as "valid" and/or MSD is received or not, and/or whether more data/update is needed or not.

If yes, in step S1214, the network (e.g., PSAP) may transmit an update request to the UE 1.

In step S1216, UE 1 may check whether more data/update is available based on the eMSD/MSD.

If more data/update is not available based on the eMSD/MSD, in step S1218, the UE 1 may transmit an update request to the UE 2 for requesting more data/update.

If more data/update is available based on the eMSD/MSD, in step S1220, the UE 1 may share the available data/information and/or blockchain with the network (e.g., PSAP).

In addition, even if more data/update is available based on the eMSD/MSD, in step S1222, the UE 1 may still transmit an update request to the UE 2 for requesting more data/update. The update request may be transmitted before and/or after step S1220.

In step S1224, the UE 2 may respond with data/update to the UE 1.

In step S1226, the UE 1 may share the received data/information and/or blockchain with the network (e.g., PSAP).

In step S1228, the network (e.g., PSAP) may consolidate all data/information, e.g., before the timer expires, and take further actions.

According to the example shown in FIGS. 11 and 12, if the neighboring UE that had received the first eMSD (as blockchain format) forwards the first eMSD to the PSAP but later moved out of that scene so that it could not receive any of following/subsequent message (second message), then the PSAP may still get a blockchain with "no update" or a blockchain with "void" (confirming no accident happened) or a blockchain with "valid" (confirming accident happened) from other neighboring UEs/robots/vehicles of the source UE/robot/vehicle that had generated genesis block. If the PSAP PSAP knows the location/moving speed/direction of the neighboring UEs/robots/vehicles (who may be a witness of the accident (not human witness but machine witness)), the PSAP may correctly interpret that the blockchain with "no update" is whether due to the neighboring UEs/robots/vehicles moving behavior out of that scene or due to possibly the total crash of the original/source UE/robot/vehicle which communication module could possibly be badly damaged to make calls or communications.

FIG. 13 shows another example of a procedure to which implementations of the present disclosure is applied.

Procedures shown in FIG. 13 may be performed following the procedures shown in FIG. 11. Compared to the procedure described in FIG. 12, FIG. 13 shows a procedure in which NG-eCall (and/or CS-based eCall) is made before eMSD2 is made.

If it is checked that the accident actually happens in step S1108 in FIG. 11, and if it is checked that the communication module still works in step S1126 in FIG. 11, in step S1300, the UE 2 may establish NG-eCall.

In step S1302, the UE 2 may transfer MSD to the network (e.g., PSAP) via eNB/gNB based on the established NG-eCall, if required by regional regulation or by operating authority.

In step S1304, the UE 2 may generate the second eMSD. For this, the UE 2 may make a next block (e.g., second block) as the second eMSD for a positive report. The positive report may inform that the accident actually happens.

In step S1306, the UE 2 may transmit/disseminate the second eMSD (e.g., second block) to the UE 1.

In step S1308, upon receiving the second eMSD (e.g., second block) from the UE 2, the UE 1 may make a next block (e.g., third block) with status updated as "valid".

In step S1310, the UE 1 may share blockchain including the third block with the network (e.g., PSAP).

In step S1312, the network (e.g., PSAP) may check whether eMSD with status as "valid" and/or MSD is received or not, and/or whether more data/update is needed or not.

If yes, in step S1314, the network (e.g., PSAP) may transmit an update request to the UE 1.

In step S1316, UE 1 may check whether more data/update is available based on the eMSD/MSD.

If more data/update is not available based on the eMSD/MSD, in step S1318, the UE 1 may transmit an update request to the UE 2 for requesting more data/update.

If more data/update is available based on the eMSD/MSD, in step S1320, the UE 1 may share the available data/information and/or blockchain with the network (e.g., PSAP).

In addition, even if more data/update is available based on the eMSD/MSD, in step S1322, the UE 1 may still transmit an update request to the UE 2 for requesting more data/update. The update request may be transmitted before and/or after step S1320.

In step S1324, the UE 2 may respond with data/update to the UE 1.

In step S1326, the UE 1 may share the received data/information and/or blockchain with the network (e.g., PSAP).

In step S1328, the network (e.g., PSAP) may consolidate all data/information, e.g., before the timer expires, and take further actions.

The present disclosure may have various advantageous effects.

For example, it can be achievable to deliver information in the event of an accident in OOC environments.

For example, it can be achievable to ensure integrity of path information of delivering nodes.

For example, a service robot may be utilized later in OOC environments (e.g., search and rescue).

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a first user equipment (UE) configured to operate in a wireless communication system, the method comprising:
   receiving, from a second UE, a precursory minimum set of data (MSD) via a first block,
   wherein the precursory MSD is an enhanced version of an MSD,
   wherein the MSD forms data component of an emergency call (eCall) sent from a vehicle to a public safety answering point (PSAP) or other designated emergency call center,
   wherein the MSD has a maximum size of 140 bytes, and
   wherein the MSD includes at least one of vehicle identity, location information and time-stamp;
   starting a timer upon receiving the precursory MSD from the second UE;
   waiting to receive a report via a second block while the timer is running;
   making a third block based on whether or not the report via the second block has been received; and
   transmitting, to a network, the third block.

2. The method of claim 1, wherein the third block is preferentially transmitted to the network than the first block and/or the second block.

3. The method of claim 1, wherein the third block informs that accident-related precursory information was not updated based on the report being not received via the second block until the timer expires.

4. The method of claim 1, wherein the third block informs that an accident did not happen based on the report which is a negative report being received via the second block.

5. The method of claim 1, wherein the third block informs that an accident happened based on the report which is a positive report being received via the second block.

6. The method of claim 1, wherein the third block includes information on a location, a direction and/or a speed of the second UE which is a UE with an accident or probable to have an accident.

7. The method of claim 1, wherein the second UE senses that an accident can happen based on an indication from a pre-crash system sensing function (PCSSF) of the second UE, and
   wherein the first block is a genesis block of a blockchain.

8. The method of claim 1, wherein the first block and/or the second block includes information on a coordinate of an accident including a vertical coordinate of the accident.

9. The method of claim 1, wherein the network corresponds to a public safety answering point (PSAP) and/or a multi-access edge computing (MEC) server.

10. The method of claim 1, wherein the first UE is in communication with at least one of a mobile device, a network, and/or autonomous vehicles other than the first UE.

11. A first user equipment (UE) configured to operate in a wireless communication system, the first UE comprising:
    at least one transceiver;
    at least one processor; and
    at least one computer memory operably connectable to the at least one processor and storing instructions that, based on being executed by the at least one processor, perform operations comprising:
    receiving, from a second UE, a precursory minimum set of data (MSD) via a first block,
    wherein the precursory MSD is an enhanced version of an MSD,
    wherein the MSD forms data component of an emergency call (eCall) sent from a vehicle to a public safety answering point (PSAP) or other designated emergency call center,
    wherein the MSD has a maximum size of 140 bytes, and
    wherein the MSD includes at least one of vehicle identity, location information and time-stamp;
    starting a timer upon receiving the precursory MSD from the second UE;
    waiting to receive a report via a second block while the timer is running;
    making a third block based on whether or not the report via the second block has been received; and
    transmitting, to a network, the third block.

12. The first UE of claim 11, wherein the third block informs that accident-related precursory information was not updated based on the report being not received via the second block.

13. The first UE of claim 11, wherein the third block informs that an accident did not happen based on the report which is a negative report being received via the second block.

14. The first UE of claim 11, wherein the third block informs that an accident happened based on the report which is a positive report being received via the second block.

15. A processing apparatus configured to control a user equipment (UE) in a wireless communication system, the processing apparatus comprising:
    at least processor; and
    at least one computer memory operably connectable to the at least one processor,
    wherein the at least one processor is configured to perform operations comprising:
    obtaining a precursory minimum set of data (MSD) via a first block,
    wherein the precursory MSD is an enhanced version of an MSD,
    wherein the MSD forms data component of an emergency call (eCall) sent from a vehicle to a public safety answering point (PSAP) or other designated emergency call center, wherein the MSD has a maximum size of 140 bytes, and
wherein the MSD includes at least one of vehicle identity, location information and time-stamp;
starting a timer upon obtaining the precursory MSD;
waiting to receive a report via a second block while the timer is running; and
making a third block based on whether or not the report via the second block has been received.

* * * * *